United States Patent
Gottlieb et al.

(10) Patent No.: US 12,151,588 B2
(45) Date of Patent: Nov. 26, 2024

(54) POWER CONTROL SYSTEM AND METHOD FOR CONTROLLING AN ELECTRIC VEHICLE INCLUDING ONE OR MORE SUPPLEMENTAL PROTECTION DEVICES

(71) Applicant: GM GLOBAL TECHNOLOGY OPERATIONS LLC, Detroit, MI (US)

(72) Inventors: Mark Daniel Gottlieb, West Bloomfield, MI (US); Venkata Prasad Atluri, Novi, MI (US); Madhusudan Raghavan, West Bloomfield, MI (US); Chandra S. Namuduri, Troy, MI (US); Suresh Gopalakrishnan, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 507 days.

(21) Appl. No.: 17/587,632

(22) Filed: Jan. 28, 2022

(65) Prior Publication Data
US 2023/0242008 A1    Aug. 3, 2023

(51) Int. Cl.
*B60L 58/16* (2019.01)
*B60L 58/13* (2019.01)
*H01M 10/42* (2006.01)

(52) U.S. Cl.
CPC ............ *B60L 58/16* (2019.02); *B60L 58/13* (2019.02); *H01M 10/425* (2013.01);
(Continued)

(58) Field of Classification Search
CPC .... B60L 58/16; B60L 58/13; B60L 2240/545; B60L 2240/549; B60L 2240/70; B60L 3/00; B60L 3/0046; B60L 3/04; B60L 3/12; H01M 10/425; H01M 2010/4271; H01M 2010/4278; H01M 2220/20; H01M 10/486; Y02T 10/70; B60R 16/02; H02J 7/0031; H02J 7/007194
See application file for complete search history.

(56) References Cited

U.S. PATENT DOCUMENTS 9,696,380 B2 *   7/2017  Huh ................... G01R 31/3278
12,036,884 B2 *  7/2024  Prasad .................... B60L 50/60
(Continued)

OTHER PUBLICATIONS

U.S. Appl. No. 17/523,719, filed Nov. 10, 2021, Gottlieb et al.
U.S. Appl. No. 17/562,567, filed Dec. 27, 2021, Atluri et al.

*Primary Examiner* — Stacy Whitmore

(57) ABSTRACT

A power control system for a battery system of a vehicle includes one or more supplemental protection devices that are connected to at least one of a first contactor, a second contactor, one of N fuses, and one of N vehicle loads. A battery management module is configured to measure and store a plurality of state of health parameters for the battery system and to selectively operate the one or more supplemental protection devices in a coverage gap between first and second coverage areas handled by the first contactor and the second contactor and the N fuses based on a calibration function and/or calibration parameters. A telematics system selectively sends the plurality of state of health parameters for the battery system to a remote server and to receive at least one of a new calibration function and new calibration parameters for the vehicle from the remote server.

20 Claims, 8 Drawing Sheets

(52) U.S. Cl.
CPC ............... *H01M 2010/4271* (2013.01); *H01M 2010/4278* (2013.01); *H01M 2220/20* (2013.01)

(56) References Cited

U.S. PATENT DOCUMENTS

| | | | |
|---|---|---|---|
| 2022/0209319 A1* | 6/2022 | Furukawa | H01M 10/441 |
| 2023/0147014 A1* | 5/2023 | Gottlieb | H01H 85/0241 |
| | | | 429/7 |
| 2023/0208159 A1* | 6/2023 | Atluri | H02J 7/0031 |
| | | | 361/102 |

* cited by examiner

POWER CONTROL SYSTEM AND METHOD FOR CONTROLLING AN ELECTRIC VEHICLE INCLUDING ONE OR MORE SUPPLEMENTAL PROTECTION DEVICES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric vehicles (EVs), and more particularly to power control systems for EVs.

Electric vehicles (EVs) include a battery system with one or more battery cells, modules and/or packs. The EV can be a battery electric vehicle (BEV), a fuel cell vehicle or a hybrid vehicle. A power control system is used to control charging and/or discharging of the battery system during charging, regeneration and/or driving. During driving, one or more electric motors of the EV receive power from the battery system to provide propulsion for the vehicle and/or to return power to the battery system during charging from a utility and/or regeneration.

The power control system is also designed to protect electrical components such as the battery pack(s), DC-DC converter(s), power inverter(s), and motor(s) from excessive current. These systems typically include contactors and fuses that attempt to isolate the battery pack(s) from the propulsion loads and/or other vehicle loads in the event of unintended faults causing large current spikes. However, coordinating protection using the contactors and fuses is difficult due to coverage gaps. Furthermore, operating the contactors and fuses within a desired reaction time is also challenging.

SUMMARY

A power control system for a battery system of a vehicle includes a first contactor including a first terminal connected to a first terminal of the battery system. A second contactor includes a first terminal connected to a second terminal of the battery system. N fuses each include a first terminal and a second terminal. The first terminals of the N fuses are connected to a second terminal of the first contactor, where N is an integer greater than zero. N vehicle loads have first terminals connected to second terminals of the N fuses. One or more supplemental protection devices are connected to at least one of the first contactor, the second contactor, one of the N fuses, and one of the N vehicle loads. A battery management module is configured to measure and store a plurality of state of health parameters for the battery system and to selectively operate the one or more supplemental protection devices in a coverage gap between a first coverage area handled by the first contactor and the second contactor and a second coverage area handled by the N fuses based on at least one of a calibration function and calibration parameters. A telematics system selectively sends the plurality of state of health parameters for the battery system to a remote server and to receive at least one of a new calibration function and new calibration parameters for the vehicle from the remote server. The battery management module replaces the at least one of a calibration function and the calibration parameters with the at least one of the new calibration function and new calibration parameters, respectively.

In other features, the plurality of state of health parameters comprises state of charge (SOC). The plurality of state of health parameters comprises battery temperature. The one or more supplemental protection devices include a third contactor including a first terminal and a second terminal; and a fuse including a first terminal and a second terminal. The first terminal of the third contactor is connected to a first terminal of the first contactor, the second terminal of the third contactor is connected to the first terminal of the fuse, and the second terminal of the fuse is connected to the first terminals of the N fuses.

In other features, the one or more supplemental protection devices includes a current sensor connected to a first one of the N fuses; and a switched resistance circuit including a first terminal connected between the first one of the N fuses and a first one of the N vehicle loads and a second terminal connected to a second terminal of the second contactor.

In other features, the switched resistance circuit comprises a resistor connected in series with a power switch. The power switch comprises a silicon-controlled rectifier (SCR). The at least one of the calibration function and the calibration parameters comprises an operational lookup table accessed using at least two of the plurality of state of health parameters. The plurality of state of health parameters comprise state of charge (SOC). The plurality of state of health parameters comprise battery temperature.

A method for operating a power control system for a battery system of a vehicle includes providing a first contactor including a first terminal connected to a first terminal of the battery system; providing a second contactor including a first terminal connected to a second terminal of the battery system; providing N fuses each including a first terminal and a second terminal, wherein the first terminals of the N fuses are connected to a second terminal of the first contactor, where N is an integer greater than zero; providing N vehicle loads having first terminals connected to second terminals of the N fuses; providing one or more supplemental protection devices connected to at least one of the first contactor, the second contactor, one of the N fuses, and one of the N vehicle loads; measuring and storing a plurality of state of health parameters for the battery system; selectively operating the one or more supplemental protection devices in a coverage gap between a first coverage area provided by the first contactor and the second contactor and a second coverage area provided by the N fuses based on at least one of a calibration function and calibration parameters; wirelessly send the plurality of state of health parameters for the battery system to a remote server; receiving at least one of a new calibration function and new calibration parameters for the vehicle from the remote server; and replacing the at least one of a calibration function and the calibration parameters with the at least one of the new calibration function and new calibration parameters, respectively.

In other features, the plurality of state of health parameters comprises state of charge (SOC). The plurality of state of health parameters comprises battery temperature. The one or more supplemental protection devices includes a third contactor including a first terminal and a second terminal; and a fuse including a first terminal and a second terminal. The first terminal of the third contactor is connected to a first terminal of the first contactor, the second terminal of the third contactor is connected to the first terminal of the fuse, and the second terminal of the fuse is connected to the first terminals of the N fuses.

In other features, the one or more supplemental protection devices includes a current sensor connected to a first one of the N fuses; and a switched resistance circuit including a first terminal connected between the first one of the N fuses and a first one of the N vehicle loads and a second terminal connected to a second terminal of the second contactor.

In other features, the switched resistance circuit comprises a resistor connected in series with a power switch. The power switch comprises a silicon-controlled rectifier (SCR). The at least one of the calibration function and the calibration parameters comprises an operational lookup table accessed using at least two of the plurality of health parameters. The plurality of state of health parameters comprises state of charge (SOC). The plurality of state of health parameters comprises battery temperature.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
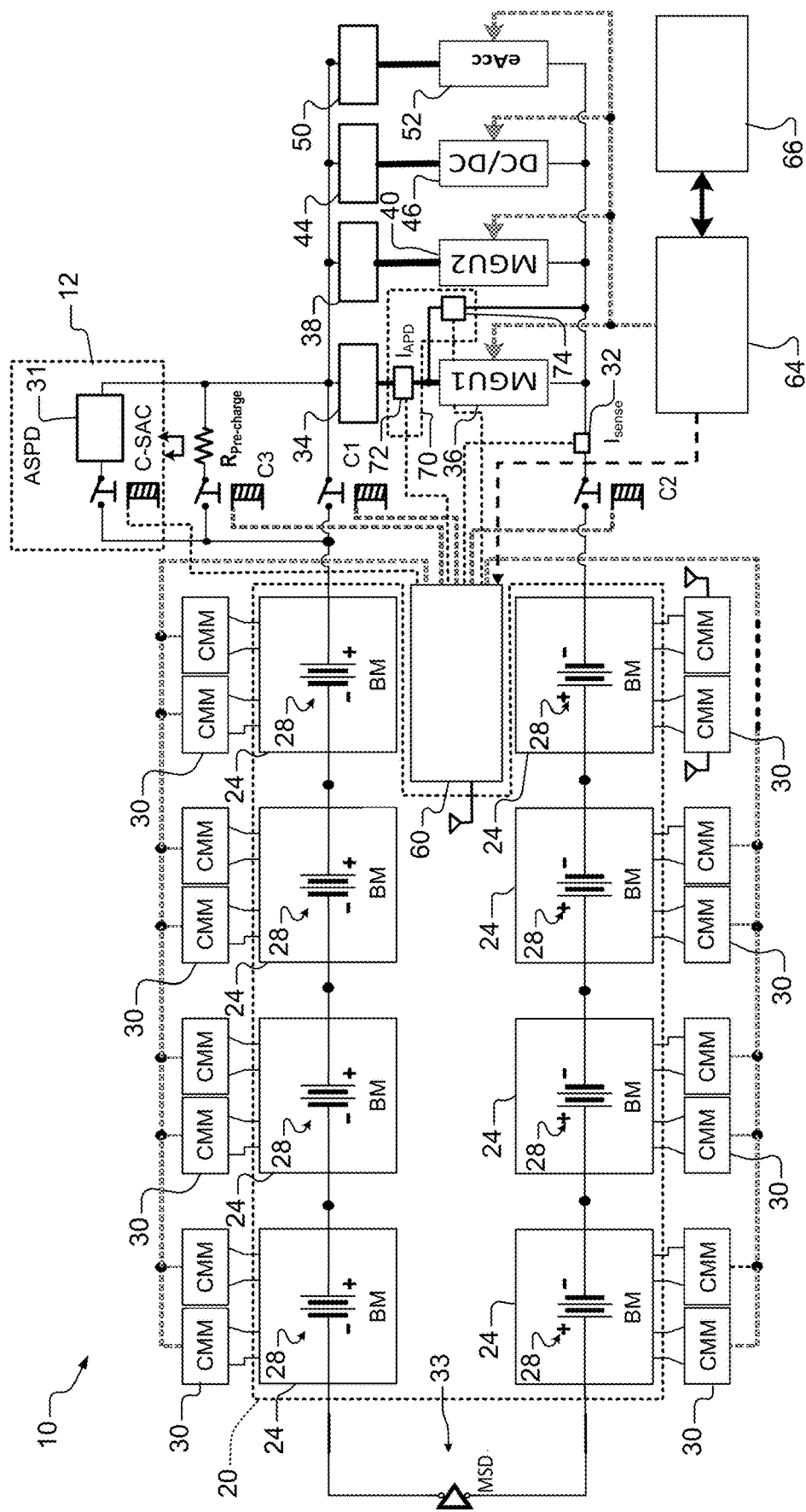
FIGS. 1A to 1C are functional block diagrams of an example of a power control system for an electric vehicle including one or more supplemental protection devices according to the present disclosure.

Power control systems for electric vehicles include one or more contactors. During normal operation of the vehicle, power flows through the one or more contactors. When a current spike occurs (such as due to a short circuit), the power control system may be unable to open one of the contactors due to the high current. In some situations, the contactor can be fused into a closed position by the current spikes.

Power control systems for electric vehicles according to the present disclosure include one or more fuses, one or more contactors and one or more supplemental protection devices. The one or more supplemental protection devices handle coverage gaps between the contactors and fuses. In some examples, the one or more supplemental protection devices include an auxiliary sacrificial protection device (ASPD) including a sacrificial contactor and fuse and an auxiliary protection device (APD) including a current sensor and a switched resistance circuit.

As the battery system of the EV ages, operation of the one or more supplemental protection devices may need to be changed or recalibrated. The vehicles may be operated in different climate zones, such as low ambient temperature or high ambient temperature zones. The same vehicle model may also be subjected to different types of usage (heavy, medium, light duty). All of these variations may cause different levels of battery cell aging. It is difficult to calibrate the contactors, fuses and/or other supplemental devices for all of these different variations at the time of manufacture.

In systems and methods according to the present disclosure, battery module/cell state of health parameters are stored over time for the vehicle and sent wirelessly to a remote server using a telematics system. Examples of state of health parameters include current, voltage, state of charge (SOC), temperature and/or other parameters. A modeling module located at the remote server performs modeling of the battery system of the vehicle using the current and/or prior battery module/cell state of health parameters for the vehicle. The modeling module generates new calibration functions/parameters for the vehicle based on the battery module/cell parameters. The remote server sends new calibration functions/parameters to the vehicle using the telematics system. As will be described further below, the vehicle operates the one or more supplemental protection devices using the new calibration functions/parameters.

In some examples, the calibration function includes an operational lookup table (LUT) that is indexed by two or more state of health parameters. In some examples, the state of health parameters comprise state of charge (SOC) and temperature or other equivalent parameters. The operational LUT defines respective operational areas for the contactors, the fuses and one or more supplemental protection devices. The modeling module receives the one or more state of health parameters, performs modeling based on the one or more state of health parameters, adjusts the operational areas for the contactors, the fuses and one or more supplemental protection devices and generates a new operational lookup table. The new operational lookup table is sent to the vehicle and to replace the prior operational lookup table.

Figure 1B:
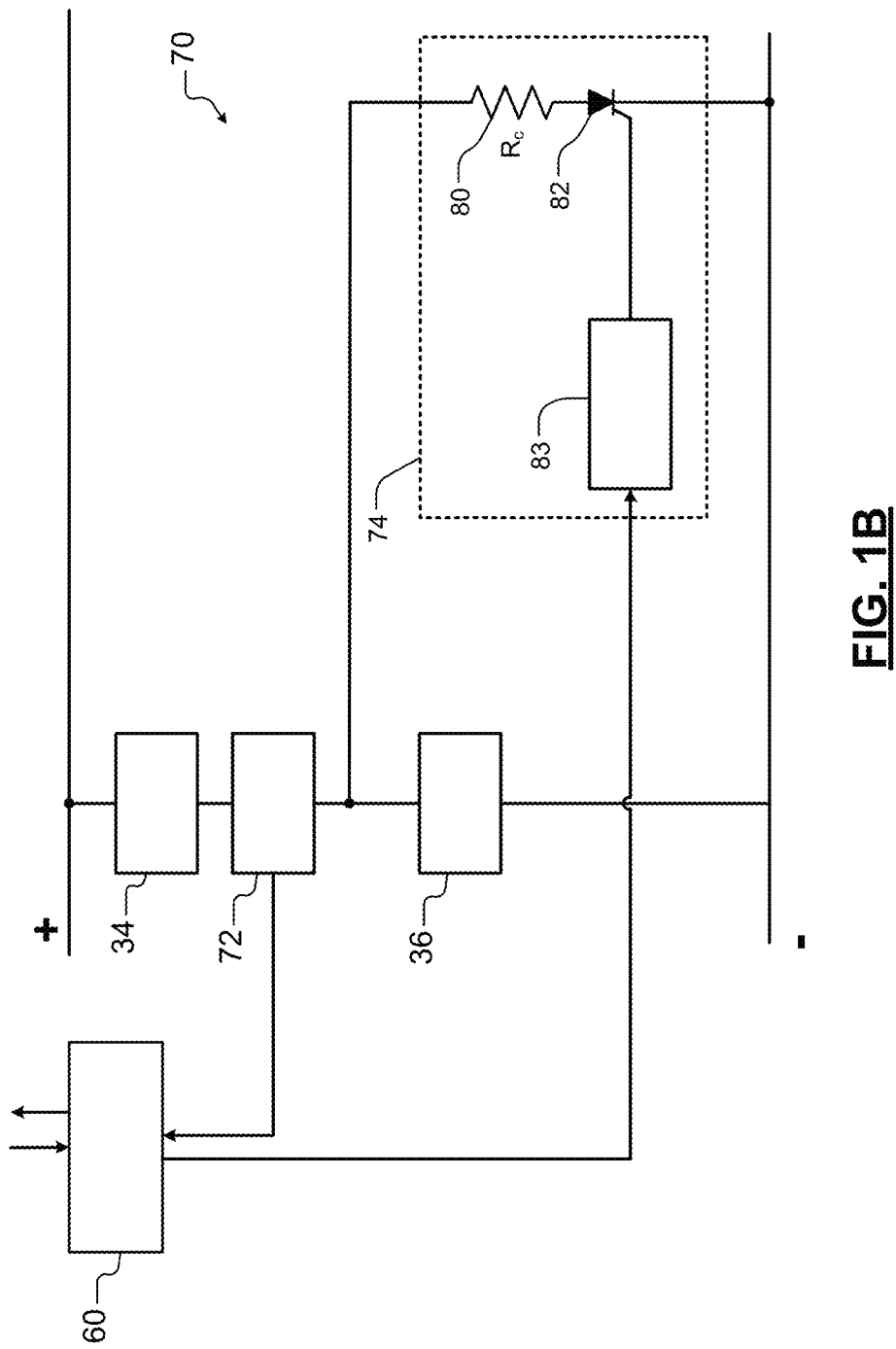
Figure 1C:
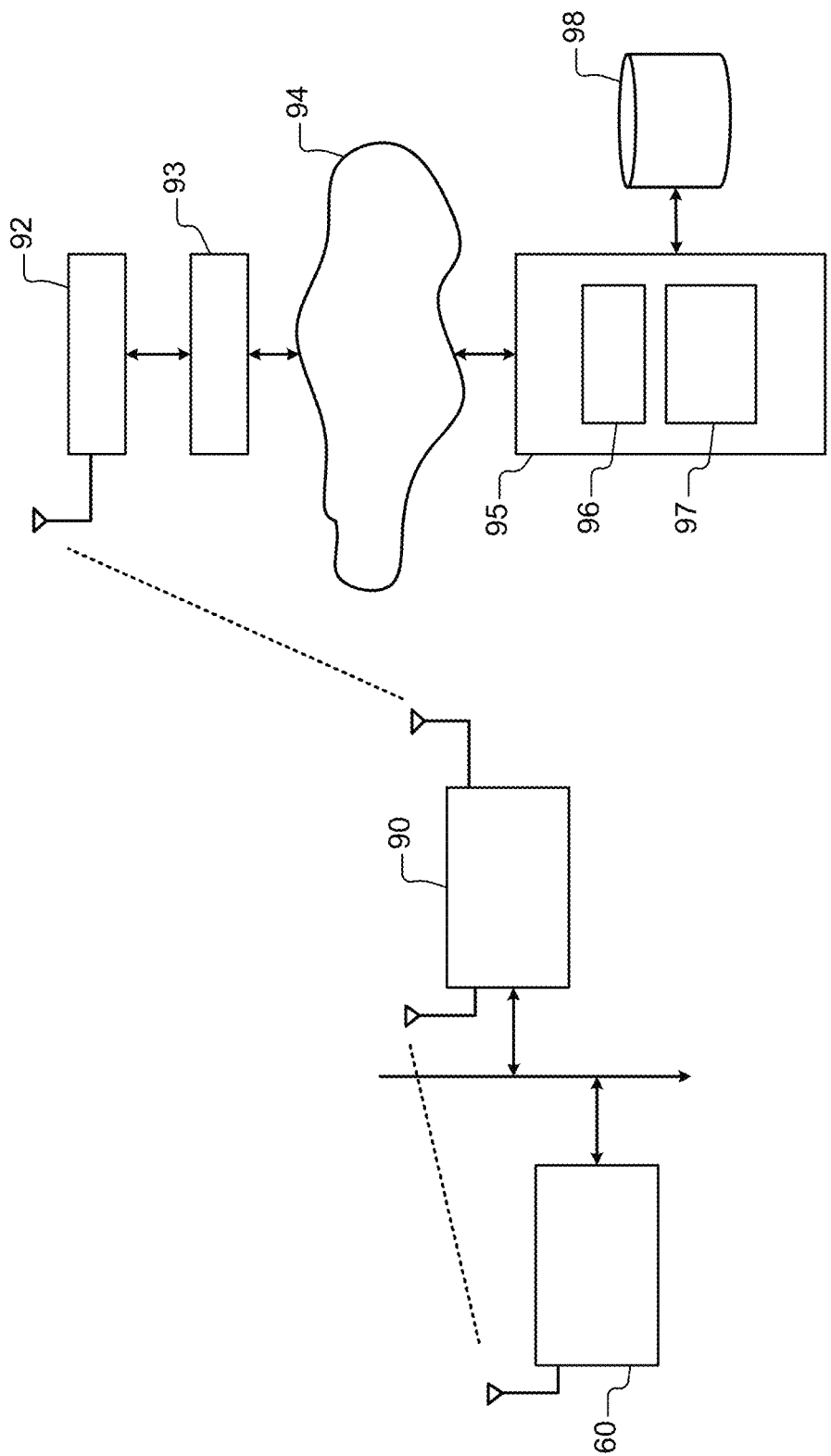

Referring now to FIGS. 1A to 1C, an example of a power control system 10 for an electric vehicle (EV) including an ASPD 12 is shown. In FIG. 1A, the ASPD 12 is connected in parallel with a contactor C1 connected to a positive terminal of a battery system 20.

In FIG. 1A, the power control system 10 includes the battery system 20 including one or more battery cells, modules and/or packs. In this example, the battery system 20 includes one or more battery packs each including N battery modules 24 (wherein N is an integer greater than one). Each of the N battery modules 24 includes M battery cells 28

(where M is an integer greater than one). For example, N may be equal to 8, M may be equal to 24 and the battery system 20 may provide high voltage (HV) such as 800V, although N and M can have other values and the voltage output of the one or more battery packs may vary.

Parameters of the M battery cells 28 of the N battery modules 24 are monitored by cell monitoring modules (CMM) 30. In some examples, each of the N battery modules 24 may include one or more of the CMMs 30 (for example, two are shown for each of the N battery modules 24). The CMMs 30 can be connected to the battery management module 60 (described below) using either wireless or wired connections. While the N battery modules 24 are connected in series in this example, the N battery modules 24 can be connected in series, parallel and/or combinations thereof.

A manual service disconnect (MSD) 33 can be connected between one or more of the N battery modules 24. For example, the MSD 33 is connected between two groups of the N battery modules (e.g. between first and second groups each including four of the N battery modules 24 that are connected in series), although other configurations can be used.

A first terminal (e.g. a positive terminal) of the battery system 20 is connected to first terminals of a first contactor C1, a third contactor C3 and an ASPD contactor C-SAC. While the ASPD contactor C-SAC is shown as a normally open contactor, a normally closed contactor can be used. In other words, the ASPD contactor C-SAC can be operated as normally open, normally closed or dynamically controlled once the first contactor is closed.

A second terminal of the third contactor is connected to a first terminal of pre-charge resistor $R_{precharge}$. A second terminal of the ASPD contactor C-SAC is connected to a fuse 31. Second terminals of the first contactor C1, the pre-charge resistor $R_{precharge}$ and the fuse 31 are connected to first terminals of fuses 34, 38, 44 and 50. Second terminals of the fuses 34, 38, 44 and 50 are connected to first terminals of a first motor generator unit (MGU1) 36, a second motor generator unit (MGU2) 40, a DC-DC converter 46 and accessory loads 52, respectively.

A second terminal of one of the N battery modules 24 is connected to a first terminal of a second contactor C2. A second terminal of the second contactor C2 is connected to a first terminal of a current sensor 32. A second terminal of the current sensor 32 is connected to second terminals of the first motor generator unit (MGU1) 38, the second motor generator unit (MGU2) 40, the DC-DC converter 46 and the accessory loads 52.

A battery management module 60 communicates with the CMMs 30, the contactors (the first contactor C1, the second contactor C2, the third contactor C3 and the ASPD contactor C-SAC), a voltage control module (VCM) 64, the current sensor 32 and an auxiliary protection device (APD) described below. A driver demand module 66 determines driver demand and outputs parameters relating to driver demand to the VCM 64, which determines a voltage of the battery system. In some examples, driver demand is based in part on pedal position.

As will be described further below, the ASPD 12 monitors fault currents using the current sensor 32. While the ASPD contactor can be closed in response to detection of fault current in this example, the power control system may also close the ASPD contactor earlier (e.g. prior to detection of a fault current) in response to other parameters such as battery state of charge (SOC), battery state of health (SOH), and/or battery temperature.

When the fault current falls into predetermined limits (or the other conditions are used and met), the ASPD 12 creates an alternative path around the first contactor C1, which allows the first contactor C1 to be opened before the fuse 31 of the ASPD 12 blows. Once the fuse 31 is blown, the respective (in this example positive) side of the battery pack is disconnected from the vehicle loads to prevent further damage.

The ASPD contactor C-SAC and the fuse 31 provide an alternate current path to add an otherwise undersized fuse in series with the existing short circuit. The alternate path prevents fusing of the first contactor C1 while opening under an otherwise overload condition. In some examples, the fuse 31 is sized smaller (e.g. it has a lower maximum current rating and/or shorter withstand duration) than the other fuses in the system such that the fuse 31 blows shortly after the ASPD contactor C-SAC is closed and the first contactor C1 is opened. In other words, the ASPD contactor C-SAC and the fuse 31 are sized so that they last long enough for the first contactor C1 to open based on operating regions.

The power control system further includes an auxiliary protection device (APD) 70 with a current sensor 72 connected between the fuse 34 and the MGU1 36. The APD 70 further includes a switched resistance circuit 74 connected in parallel to the MGU1 36. The battery management module 60 receives the measured current $I_{APD}$ from the current sensor 72 and selectively causes the switched resistance circuit 74 to connect in parallel to the MGU1 36 as will be described further below. When the APD 70 closes the switch in the switched resistance circuit, the resistance of the switched resistance circuit 74 is configured to lower an overall resistance between the first terminal 232 and the second terminal 236 and flow sufficient current to blow the fuse 34.

Referring now to FIG. 1B, an example of the switched resistance circuit 74 is shown to include a resistance $R_c$ connected in series with a power switch 82. In some examples, the power switch 82 includes a silicon-controlled rectifier (SCR), although other types of power switches can be used. The power switch 82 includes a first terminal, a second terminal and a control terminal. The switched resistance circuit 74 further includes a gate control circuit 83 that controls a state of the power switch 82 by outputting a control signal to the control terminal. In some examples, the battery management module 60 controls the gate control circuit 83 to selectively close the power switch 82 (connecting the resistance $R_c$ in parallel with the MGU1) or open the power switch 82 based on a calibration function/parameters.

Referring now to FIG. 10, the battery management module 60 measures and stores battery state of health (SOH) parameters for the battery cells, modules and/or packs. The battery management module 60 selectively sends the battery state of health (SOH) parameters for the battery cells, modules and/or packs over a vehicle bus 89 to a telematics system 90. Alternately, the battery management module 60 includes a transceiver that wirelessly transmits the battery state of health (SOH) parameters to the telematics system 90 via a vehicle wireless network. The telematics system 90 sends the battery state of health (SOH) parameters for the vehicle to a remote server 95. The battery state of health (SOH) parameters for the battery cells, modules and/or packs are sent by the telematics system 90 to a remote wireless transceiver 92 (such as a cellular or satellite transceiver). In some examples, the remote wireless transceiver 92 may forward the battery state of health (SOH) parameters for the battery cells, modules and/or packs to the remote server 95 via a server 93 and a distributed communications system 94.

The remote server 95 includes a modeling module 96 and a data handling module 97. The data handling module 97 stores the battery state of health (SOH) parameters for the battery cells, modules and/or packs for the vehicle in a database 98. The modeling module 96 generates a new calibration function/parameters for the vehicle based on one or more sets of the battery state of health (SOH) parameters for the battery cells, modules and/or packs. The remote server 95 forwards new calibration function/parameters to the vehicle via the telematics system 90. The vehicle stores the new calibration functions/parameters and the battery management system or power control system controls operation of the one or more supplemental protection devices based thereon.

Figure 2:
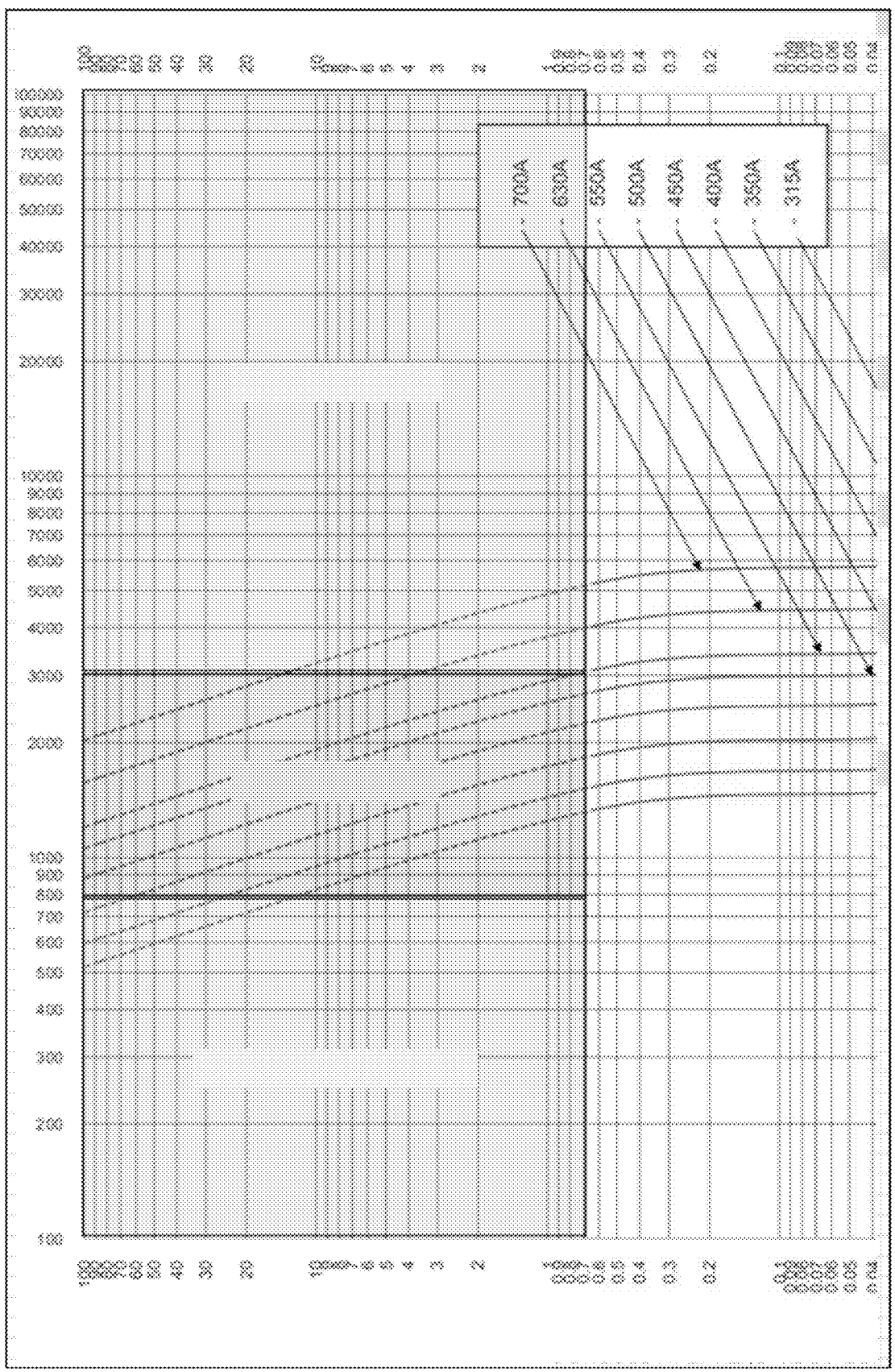
FIG. 2 is a graph illustrating an example of coverage areas using fuses and contactors and a coverage gap as a function of reaction time and fault current using a power control system without the one or more supplemental protection devices.
Figure 4:
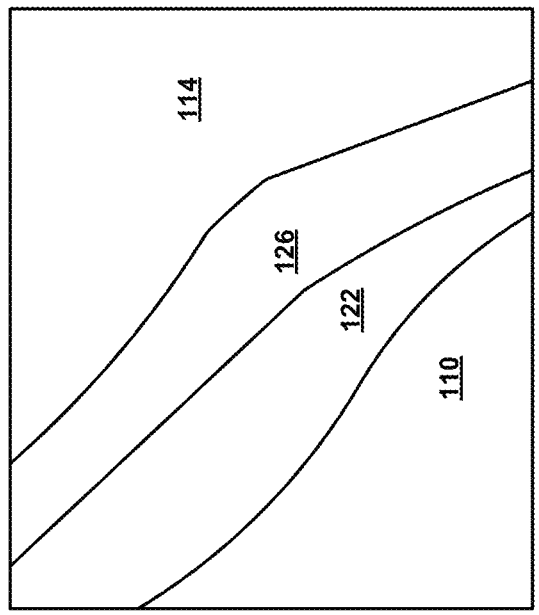
FIG. 4 is a graph illustrating an example of coverage areas using fuses, contactors and one or more supplemental protection devices as a function of state of charge and temperature according to the present disclosure.
Figure 3:
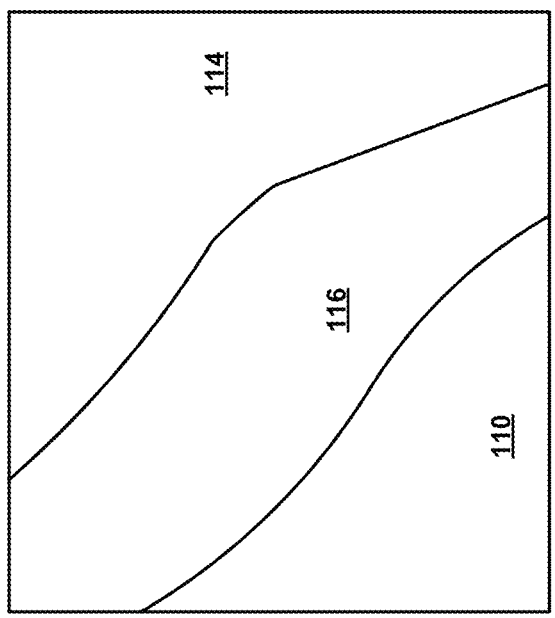
FIG. 3 is a graph illustrating an example of coverage areas using fuses and contactors and a coverage gap as a function of state of charge and temperature.

Referring now to FIGS. 2-4, coverage of current by the contactors and fuses and a coverage gap are shown for systems without the one or more supplemental protection devices (such as the ASPD and/or APD) (FIGS. 2 and 3) and with the one or more supplemental protection devices (such as the ASPD and APD) (FIG. 4). In FIG. 3, an example of coverage using contactors (coverage area 110) and fuses (coverage area 114) and a coverage gap (coverage area 116) are shown as a function of state of charge (SOC) and temperature without the ASPD 12 or the APD 70.

In FIG. 4, an example of coverage using contactors (coverage area 110), fuses (coverage area 114), the ASPD (coverage area 122) and the APD (coverage area 126) are shown as a function of SOC and temperature with the ASPD 12. While SOC and temperature are shown, other parameters indicative of SOC or temperature can be used.

Figure 5:
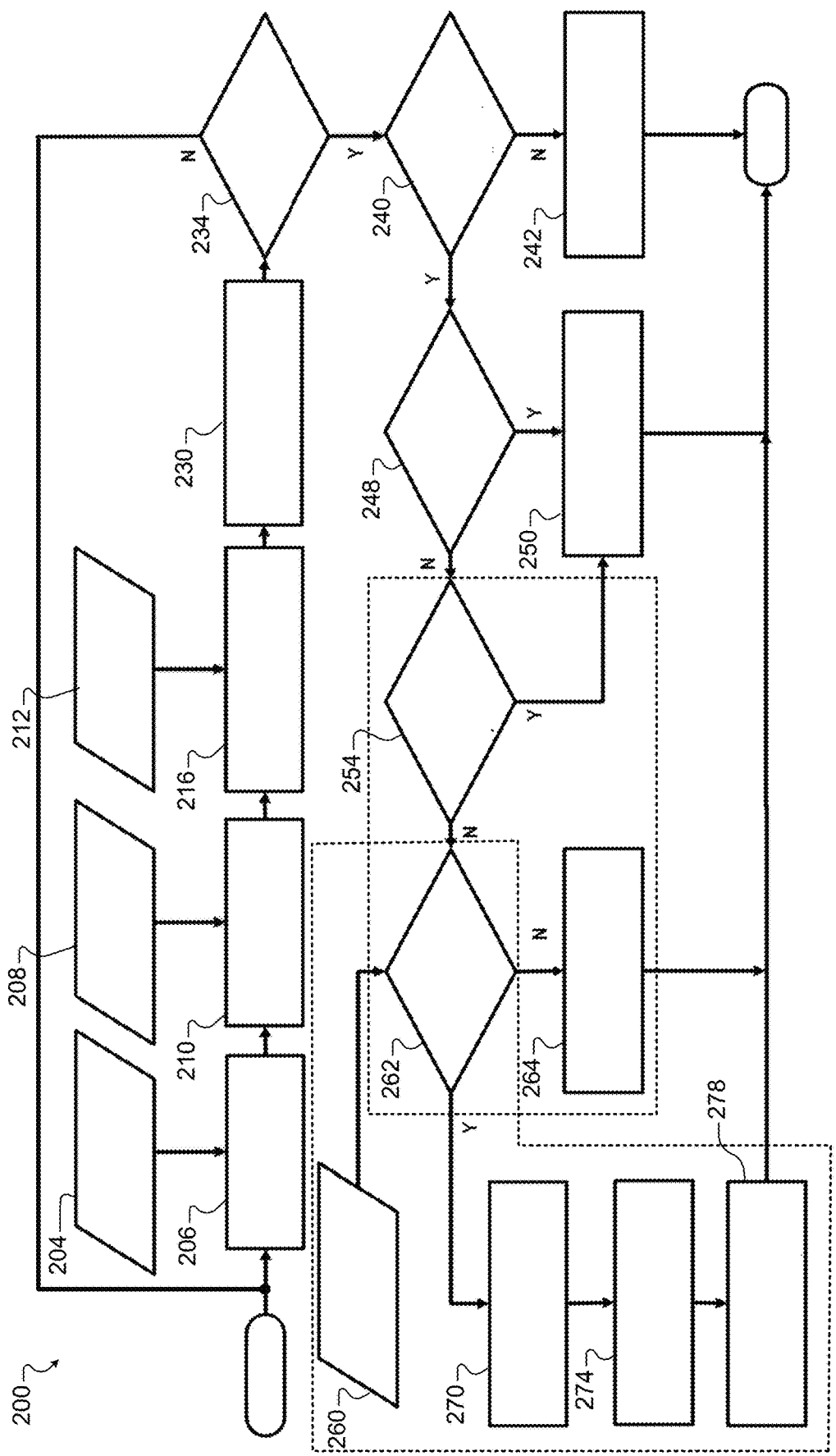
FIG. 5 is a flowchart of an example of a method for controlling the one or more supplemental protection devices according to the present disclosure.

Referring now to FIG. 5, a method 200 for controlling the supplemental protection devices is shown for the case where the ASPD and APD of FIG. 1A are used. At 204 and 206, the method measures $I_{APD}$ using the current sensor 72. At 208 and 210, the method measures load current $I_{act}$ using the current sensor 32. At 216, the method calculates commanded total load current $I_{cmd}$. The commanded total load current $I_{cmd}$ is based on driver demand, demand from other vehicle loads, etc.

At 230, the method calculates the error current $I_{err}=I_{act}-I_{cmd}$. At 234, the method determines whether the error current $I_{err}$ is greater than a current threshold $I_{TH}$. If 234 is false, the method returns to 206. If 234 is true, the method continues at 240 and determines whether $I_{act}$ is greater than a maximum amplitude of the first contactor C1. In some examples, the maximum amplitude of the first contactor C1 may correspond to a line between areas 110 and 122 in FIG. 4.

If 240 is false, the method opens the first contactor that is parallel to the ASPD at 242. If 240 is true, the method continues at 248 and determines whether $I_{act}$ is greater than a minimum amperage of the fuse. In some examples, the minimum amperage of the fuse corresponds to a line between areas 126 and 114 in FIG. 4. If 248 is true, the method continues at 250 and takes no action (allowing the main fuse to blow).

If 248 is false, the method continues at 254 and determines whether conditions $I_{APD}$ is greater than a minimum current value for the fuse 34. If 254 is false, the method continues at 262 where the method determines whether or not to operate the ASPD. In some examples, this determination is made by indexing an operational lookup table such as the one shown in FIG. 4 using SOC and temperature or other parameters indicative of SOC and temperature.

If 262 is false, the method operates the APU (and allows the fuse to blow) at 264. If 262 is true, the method continues at 270 and closes the sacrificial contactor C-SAC. Closing of the sacrificial contactor C-SAC creates a current divider using the ASPD 12 to reduce the current through the first contactor C1. At 270, the first contactor C1 is opened (in part due to the reduced current through the first contactor C1 due to the ASPD). At 278, current flowing through the fuse 31 causes the fuse 31 to blow, which opens the circuit.

As can be appreciated, the systems and methods described herein detect short circuits when operating in the coverage gap region and operate one or more supplemental protection devices in response thereto. As described herein, coverage areas for the supplemental protection devices are adjusted throughout the life of the vehicle and aging of the battery cells to ensure that the one or more supplemental protection devices operate correctly.

Figure 6:
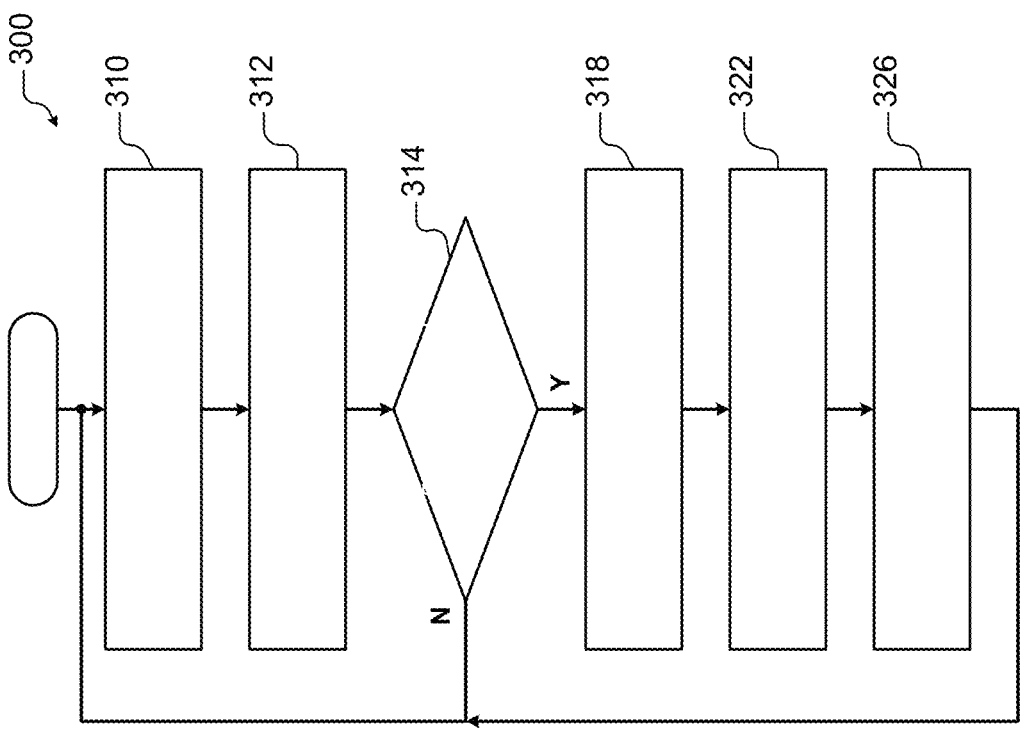
FIG. 6 is a flowchart of an example of a method for sending battery module/cell state of health parameters for a power control system including the supplemental protection devices to a remote server according to the present disclosure.

Referring now to FIG. 6, a method 300 for operating the power control system is shown. At 310, the battery management system uses a calibration function and/or calibration parameters to control operation of supplemental protection devices such as the APU and ASPD. At 312, the battery monitoring system measures and stores battery module/cell state of health parameters such as voltage, current, temperature, state of charge (SOC), etc. At 314, the method determines whether a predetermined period is up or an event occurs. If 314 is true, the method continues at 318 and transmits selected battery module/cell state of health parameters to a remote server via a telematics system. At 322, the vehicle receives new calibration functions/parameters from remote server. At 326, the method replaces prior calibration functions/parameters with new calibration functions/parameters from remote server. The power control system and/or battery management system operates the supplemental protection devices using the new calibration functions/parameters from the remote server.

Figure 7:
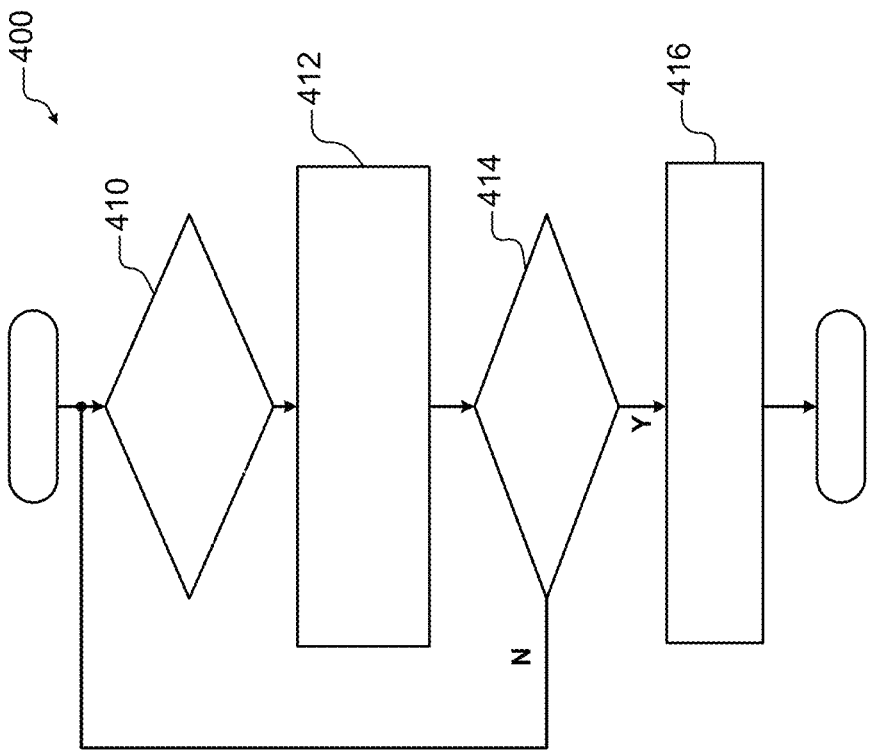
FIG. 7 is a flowchart of an example of a method for performing modeling for a vehicle using the battery module/cell state of health parameters and generating new calibration functions/parameters according to the present disclosure.

Referring now to FIG. 7, a method 400 for operating the remote server is shown. At 410, method determines whether battery module/cell state of health information is received for a vehicle. At 412, modeling is performed on battery module/cell state of health information received from vehicle and new calibration functions/parameters are generated. At 414, the method determines whether calibration functions/parameters for the vehicle have changed. If 414 is false, the method returns to 410. If 414 is true, the method sends new calibration function//parameters from the remote server to the vehicle.

Figure 8B:
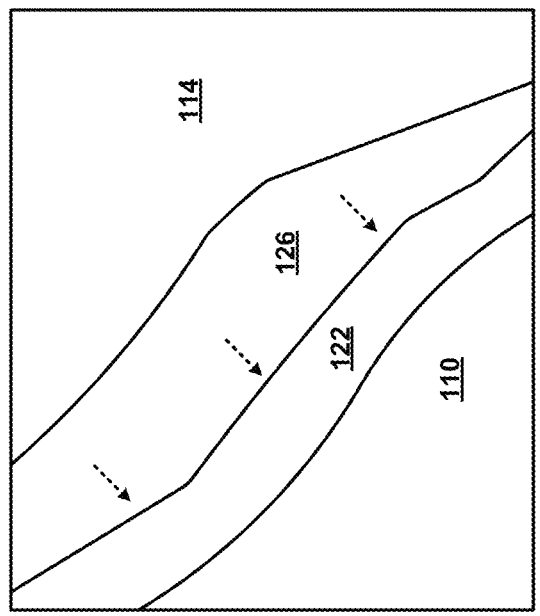
FIGS. 8A and 8B are graphs illustrating examples of prior and new coverage areas, respectively, when using fuses, contactors and one or more supplemental protection devices as a function of state of charge and temperature according to the present disclosure.
Figure 8A:
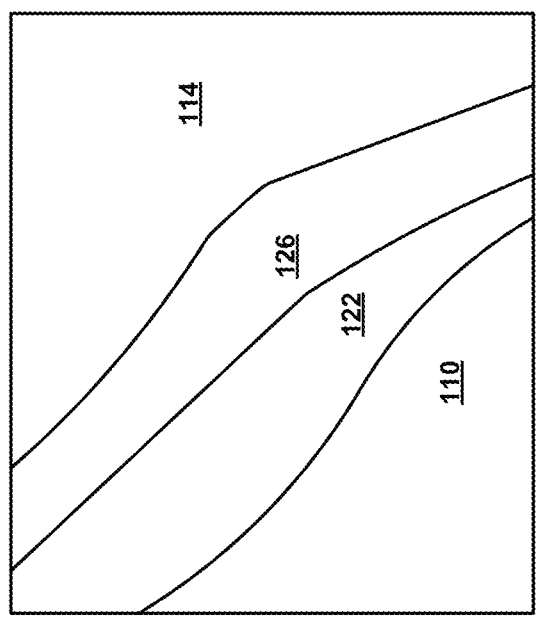

Referring now to FIGS. 8A and 8B, an example of calibration functions/parameters are shown. In FIG. 8A, prior calibration functions/parameters are shown. In FIG. 8B, new calibration functions/parameters are shown. In this example, the calibration functions/parameters include an operational lookup table that is indexed by SOC and temperature or equivalent values. As can be seen when comparing FIGS. 8A and 8B, the ASPD area 122 and APU area 126 have changed due to aging of the battery cells, modules and/or packs as shown by arrows. The new calibration functions/parameters adjust operation of the supplemental protection device based on aging of battery cells of the battery system.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A power control system for a battery system of a vehicle, comprising:
   a first contactor including a first terminal connected to a first terminal of the battery system;
   a second contactor including a first terminal connected to a second terminal of the battery system;
   N fuses each including a first terminal and a second terminal, wherein the first terminals of the N fuses are connected to a second terminal of the first contactor, where N is an integer greater than zero;
   N vehicle loads having first terminals connected to second terminals of the N fuses;
   one or more supplemental protection devices connected to at least one of the first contactor, the second contactor, one of the N fuses, and one of the N vehicle loads;
   a battery management module configured to measure and store a plurality of state of health parameters for the battery system and to selectively operate the one or more supplemental protection devices in a coverage gap between a first coverage area handled by the first contactor and the second contactor and a second coverage area handled by the N fuses based on at least one of a calibration function and calibration parameters; and
   a telematics system to selectively send the plurality of state of health parameters for the battery system to a remote server and to receive at least one of a new calibration function and new calibration parameters for the vehicle from the remote server,
   wherein the battery management module replaces the at least one of a calibration function and the calibration parameters with the at least one of the new calibration function and new calibration parameters, respectively.

2. The power control system of claim 1, wherein the plurality of state of health parameters comprises state of charge (SOC).

3. The power control system of claim 2, wherein the plurality of state of health parameters comprises battery temperature.

4. The power control system of claim 1, wherein the one or more supplemental protection devices includes:
   a third contactor including a first terminal and a second terminal; and
   a fuse including a first terminal and a second terminal,
   wherein the first terminal of the third contactor is connected to a first terminal of the first contactor, the second terminal of the third contactor is connected to the first terminal of the fuse, and the second terminal of the fuse is connected to the first terminals of the N fuses.

5. The power control system of claim 1, wherein the one or more supplemental protection devices includes:
   a current sensor connected to a first one of the N fuses; and
   a switched resistance circuit including a first terminal connected between the first one of the N fuses and a first one of the N vehicle loads and a second terminal connected to a second terminal of the second contactor.

6. The power control system of claim 5, wherein the switched resistance circuit comprises a resistor connected in series with a power switch.

7. The power control system of claim 6, wherein the power switch comprises a silicon-controlled rectifier (SCR).

8. The power control system of claim 1, wherein the at least one of the calibration function and the calibration parameters comprises an operational lookup table accessed using at least two of the plurality of state of health parameters.

9. The power control system of claim 8, wherein the plurality of state of health parameters comprise state of charge (SOC).

10. The power control system of claim 8, wherein the plurality of state of health parameters comprise battery temperature.

11. A method for operating a power control system for a battery system of a vehicle, comprising:
    providing a first contactor including a first terminal connected to a first terminal of the battery system;
    providing a second contactor including a first terminal connected to a second terminal of the battery system;
    providing N fuses each including a first terminal and a second terminal, wherein the first terminals of the N fuses are connected to a second terminal of the first contactor, where N is an integer greater than zero;
    providing N vehicle loads having first terminals connected to second terminals of the N fuses;
    providing one or more supplemental protection devices connected to at least one of the first contactor, the second contactor, one of the N fuses, and one of the N vehicle loads;
    measuring and storing a plurality of state of health parameters for the battery system;
    selectively operating the one or more supplemental protection devices in a coverage gap between a first coverage area provided by the first contactor and the second contactor and a second coverage area provided by the N fuses based on at least one of a calibration function and calibration parameters;
    wirelessly send the plurality of state of health parameters for the battery system to a remote server;
    receiving at least one of a new calibration function and new calibration parameters for the vehicle from the remote server; and
    replacing the at least one of a calibration function and the calibration parameters with the at least one of the new calibration function and new calibration parameters, respectively.

12. The method of claim 11, wherein the plurality of state of health parameters comprises state of charge (SOC).

13. The method of claim 12, wherein the plurality of state of health parameters comprises battery temperature.

14. The method of claim 11, wherein the one or more supplemental protection devices includes:
    a third contactor including a first terminal and a second terminal; and
    a fuse including a first terminal and a second terminal,
    wherein the first terminal of the third contactor is connected to a first terminal of the first contactor, the second terminal of the third contactor is connected to the first terminal of the fuse, and the second terminal of the fuse is connected to the first terminals of the N fuses.

15. The method of claim 11, wherein the one or more supplemental protection devices includes:
    a current sensor connected to a first one of the N fuses; and
    a switched resistance circuit including a first terminal connected between the first one of the N fuses and a first one of the N vehicle loads and a second terminal connected to a second terminal of the second contactor.

16. The method of claim 15, wherein the switched resistance circuit comprises a resistor connected in series with a power switch.

17. The method of claim 16, wherein the power switch comprises a silicon-controlled rectifier (SCR).

18. The method of claim 11, wherein the at least one of the calibration function and the calibration parameters comprises an operational lookup table accessed using at least two of the plurality of state of health parameters.

19. The method of claim 18, wherein the plurality of state of health parameters comprises state of charge (SOC).

20. The method of claim 18, wherein the plurality of state of health parameters comprises battery temperature.

* * * * *